(12) United States Patent
Huang

(10) Patent No.: US 7,043,798 B2
(45) Date of Patent: May 16, 2006

(54) HINGE DEVICE FOR FOLDABLE APPARATUS

(75) Inventor: Chin-Fa Huang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 127 days.

(21) Appl. No.: 10/863,098

(22) Filed: Jun. 7, 2004

(65) Prior Publication Data

US 2005/0283946 A1 Dec. 29, 2005

(30) Foreign Application Priority Data

Jun. 6, 2004 (TW) ................ 92210431 U

(51) Int. Cl.
*E05D 11/10* (2006.01)
(52) U.S. Cl. .............. 16/330; 16/303; 16/332
(58) Field of Classification Search .......... 16/330, 16/328, 327, 332, 345, 347, 352, 353, 303; 455/575.1; 361/680–682; 248/917–921
See application file for complete search history.

(56) References Cited

U.S. PATENT DOCUMENTS

| | | | | |
|---|---|---|---|---|
| 6,175,990 B1 * | 1/2001 | Kato et al. .......... | | 16/334 |
| 6,305,050 B1 | 10/2001 | Imai | | |
| 6,684,455 B1 * | 2/2004 | Mertin .......... | | 16/334 |
| 6,772,481 B1 * | 8/2004 | Oshima et al. .......... | | 16/330 |
| 6,948,217 B1 * | 9/2005 | Higano et al. .......... | | 16/303 |
| 2004/0237259 A1 * | 12/2004 | Huang et al. .......... | | 16/330 |
| 2004/0261224 A1 * | 12/2004 | Li et al. .......... | | 16/330 |

FOREIGN PATENT DOCUMENTS

| | | |
|---|---|---|
| EP | 1103688 A2 | 5/2001 |
| JP | 1-212052 A | 8/1989 |
| JP | 7-11831 A | 1/1995 |
| JP | 2000-337008 A | 12/2000 |

* cited by examiner

*Primary Examiner*—Chuck Y. Mah
*Assistant Examiner*—Michael J. Kyle
(74) *Attorney, Agent, or Firm*—Wei Te Chung

(57) ABSTRACT

A hinge device for a foldable apparatus includes first and second hinge sleeves (20, 70) connected respectively to two parts of the foldable apparatus, a spring member (30) received in the first hinge sleeve, a first disk (50) fitted untreatably into the first sleeve, a second disk (60) fitted unrotatably into the second sleeve and abutting the first disk, a pin (90) sandwiched between the first and second disk, and a shaft (10) combining the first and second hinge sleeves together. The first disk defines a receiving recess (511) to receive the pin. The second disk defines two engaging recesses (621, 622). By opening and closing motions of the foldable apparatus, the second disk rotates relative to the first disk so that the pin received in the receiving recess switchably moves with rotation from one engaging recess to the other engaging recess.

19 Claims, 5 Drawing Sheets

US 7,043,798 B2

HINGE DEVICE FOR FOLDABLE APPARATUS

BACKGROUND OF THE INVENTION

1. Field of the Invention

The present invention relates to hinge devices to be used for a foldable apparatus comprising a first body and a second body, and particularly to a hinge device which holds the first body to any intermediary angular position relative to the second body between a fully closed position and the fully opened position, and stays the first body at a certain intermediary angular position.

2. Description of the Related Art

A conventional hinge device is disclosed in Japanese Patent Publication No. 1-212052, which is used for a portable telephone. The hinge device comprises a lot of discrete elements which need to be assembled to the portable telephone one by one. It makes the assembling process unduly cumbersome.

Another conventional hinge device is disclosed in U.S. Pat. No. 6,305,050, which is used for a portable telephone comprising a fixed disk of a main body and a movable disk of a cover. The movable disk resiliently abuts the fixed disk under an effect of a coil spring. The fixed disk defines a plurality of recesses in an abutment facet of the movable disk. The movable disk forms a plurality of engaging projections for engaging in the recesses of the fixed disk. The process of assembling the hinge device to the portable telephone is simplified, because the hinge device is assembled before being attached to the portable telephone. However, it suffers from sliding friction when the projections climb up the recesses. The abutment facet is prone to be worn because of the sliding friction. After many-times opening and closing operations, the projections and the recesses will get abrasion, which causes worse effect of holding and staying of the cover. In particular, the friction areas are fixed in this hinge device, so the hinge device at these areas is easier to be abraded, therefore shortening the life span of the hinge device.

Thus, a hinge device for a foldable apparatus which solves the above-mentioned problems is strongly desired.

SUMMARY OF THE INVENTION

Accordingly, an object of the present invention is to provide a hinge device with a simple structure which holds a first body at any intermediary angular position relative to a second body between the fully closed position and the fully opened position and stay the first body at a certain intermediary angular position.

Another object of the present invention is to provide a hinge device which has less friction coefficient and therefore has longer life span.

Still another object of the present invention is to provide a hinge device whose abrasion areas are equalized.

To achieve the above-mentioned objects, a hinge device in accordance with a preferred embodiment of the present invention comprises first and second hinge sleeves connected respectively to two parts of a foldable apparatus, a spring member received in the first hinge sleeve, a first disk fitted unrotatably into the first sleeve, a stopper sandwiched between the first disk and the first sleeve, a second disk fitted unrotatably into the second sleeve and abutting the first disk, a pin sandwiched between the first and second disk, and a shaft combining the first and second hinge sleeves together. The first disk defines a receiving recess to receive the pin. The second disk defines two engaging recesses. By opening and closing motions of the two parts of the foldable apparatus, the second disk rotates relative to the first disk so that the pin received in the receiving recess switchably moves with rotation from one engaging recess to the other engaging recess.

In the present invention, a rotation of the pin is added so that the friction areas of the pin are variable in the whole operation. Relative anti-abrasion of the hinge device is thus improved.

Other objects, advantages and novel features of the present invention will be drawn from the following detailed description of a preferred embodiment of the present invention with attached drawing portions, in which:

DETAILED DESCRIPTION OF THE INVENTION

Figure 1:
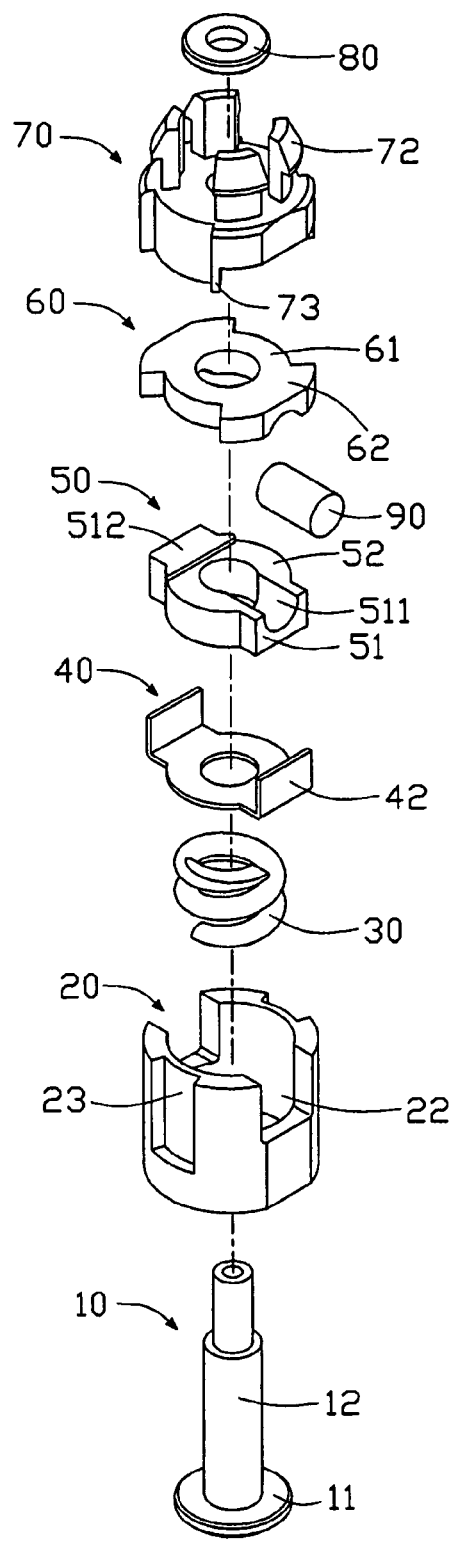
FIG. 1 is an exploded, isometric view of a hinge device in accordance with a preferred embodiment of the present invention.
Figure 2:
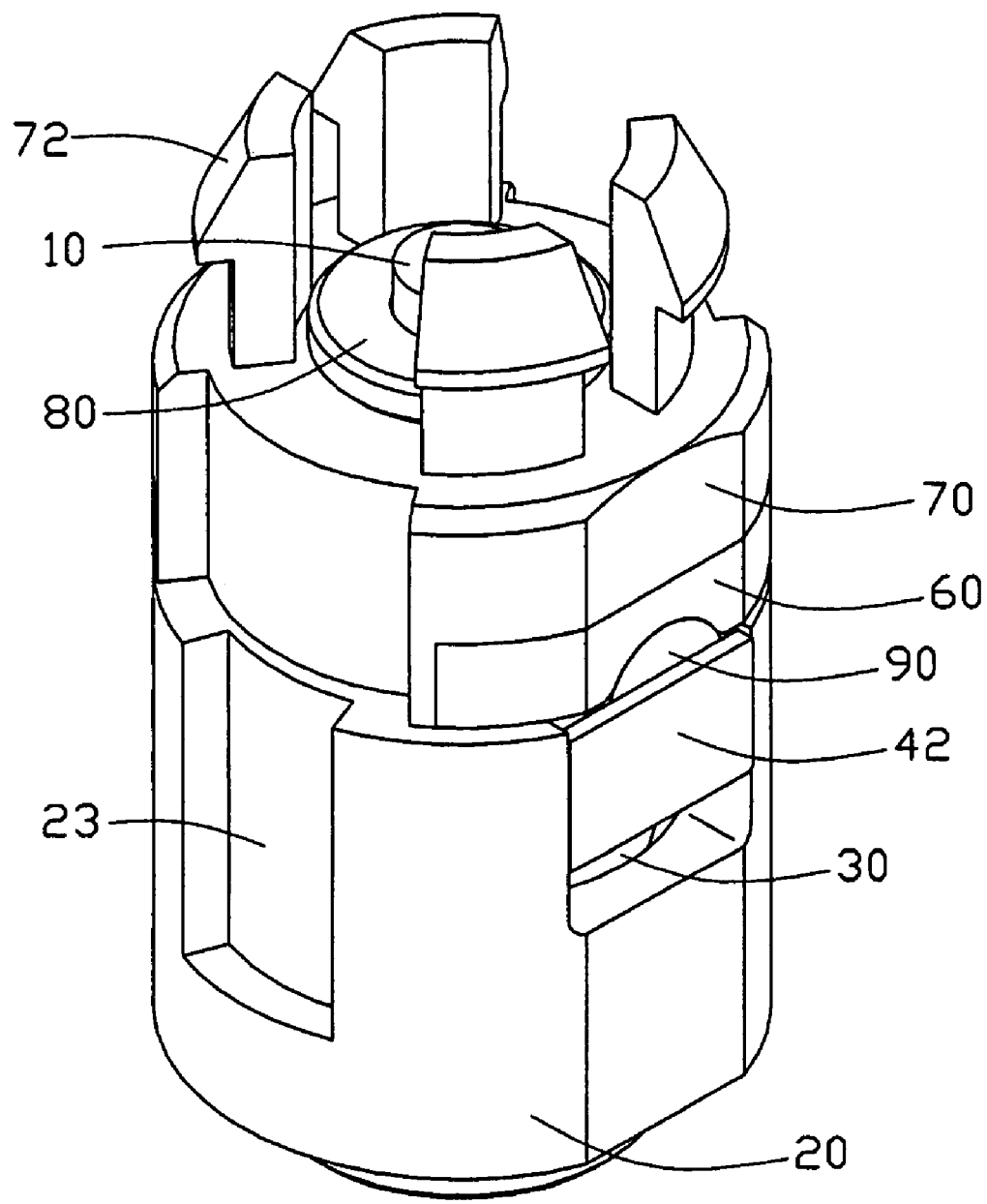
FIG. 2 is an assembled view of FIG. 1.
Figure 3:
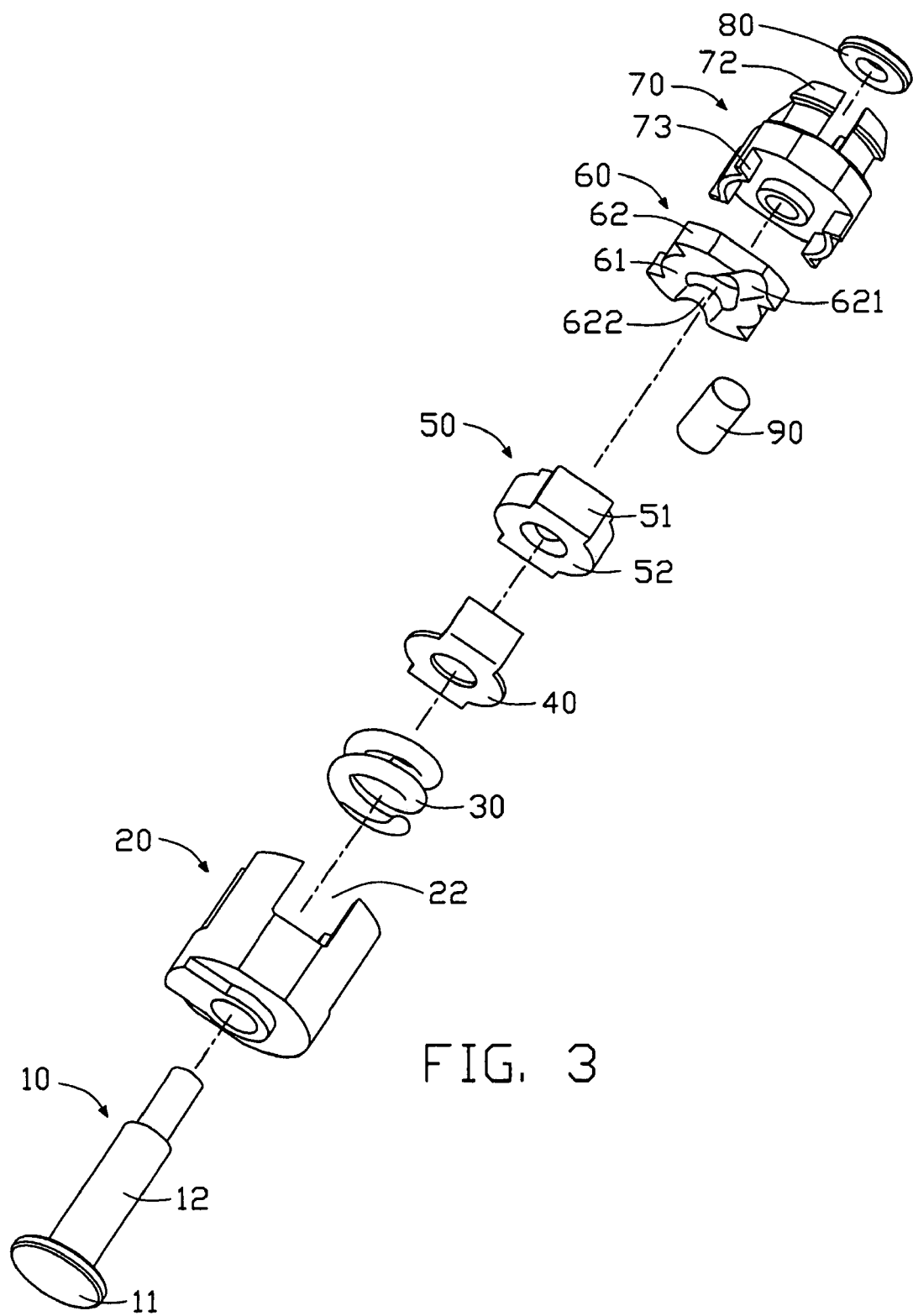
FIG. 3 is similar to FIG. 1, but view from another aspect.
Figure 4:
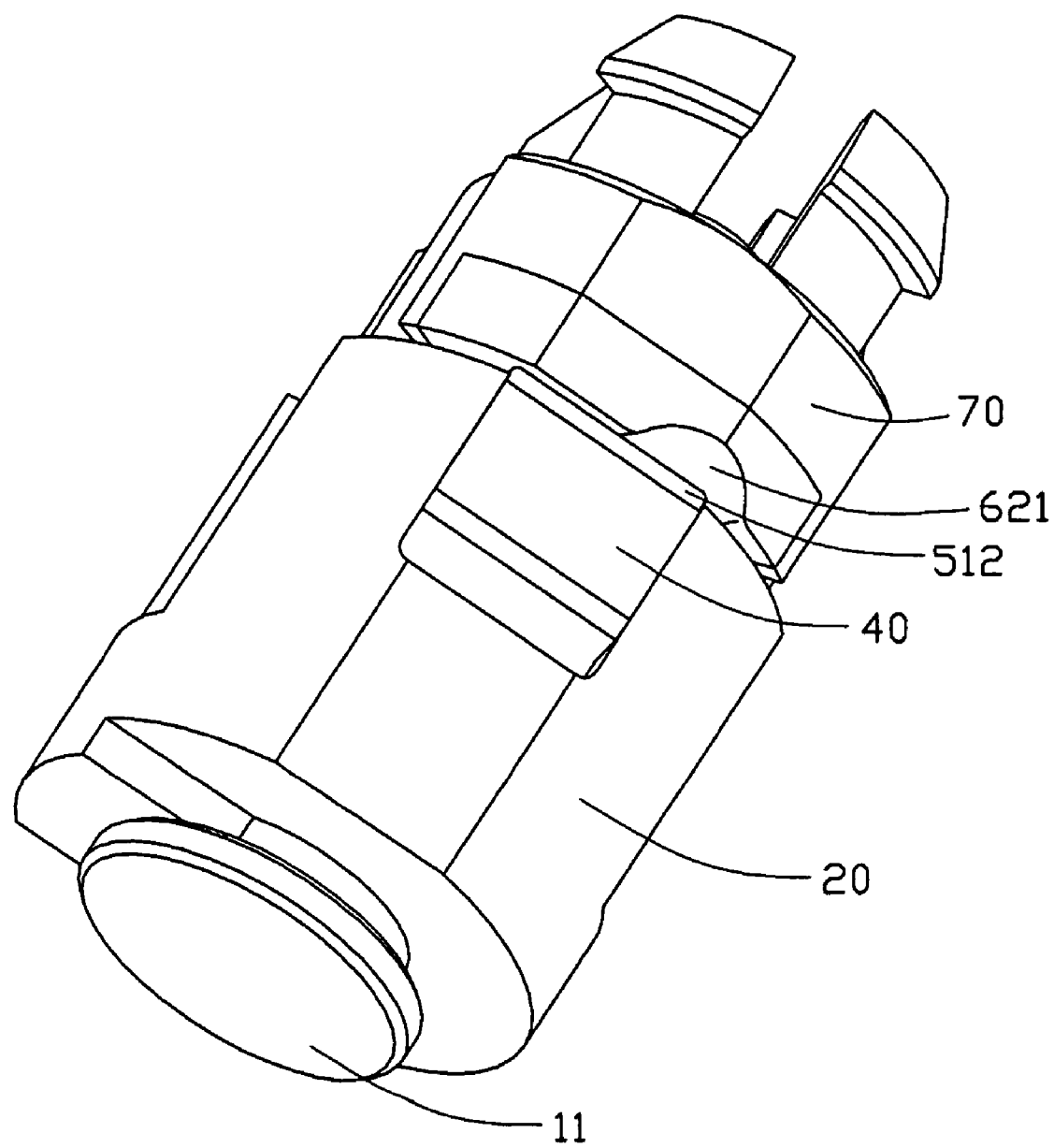
FIG. 4 is an assembled view of FIG. 3.
Figure 5:
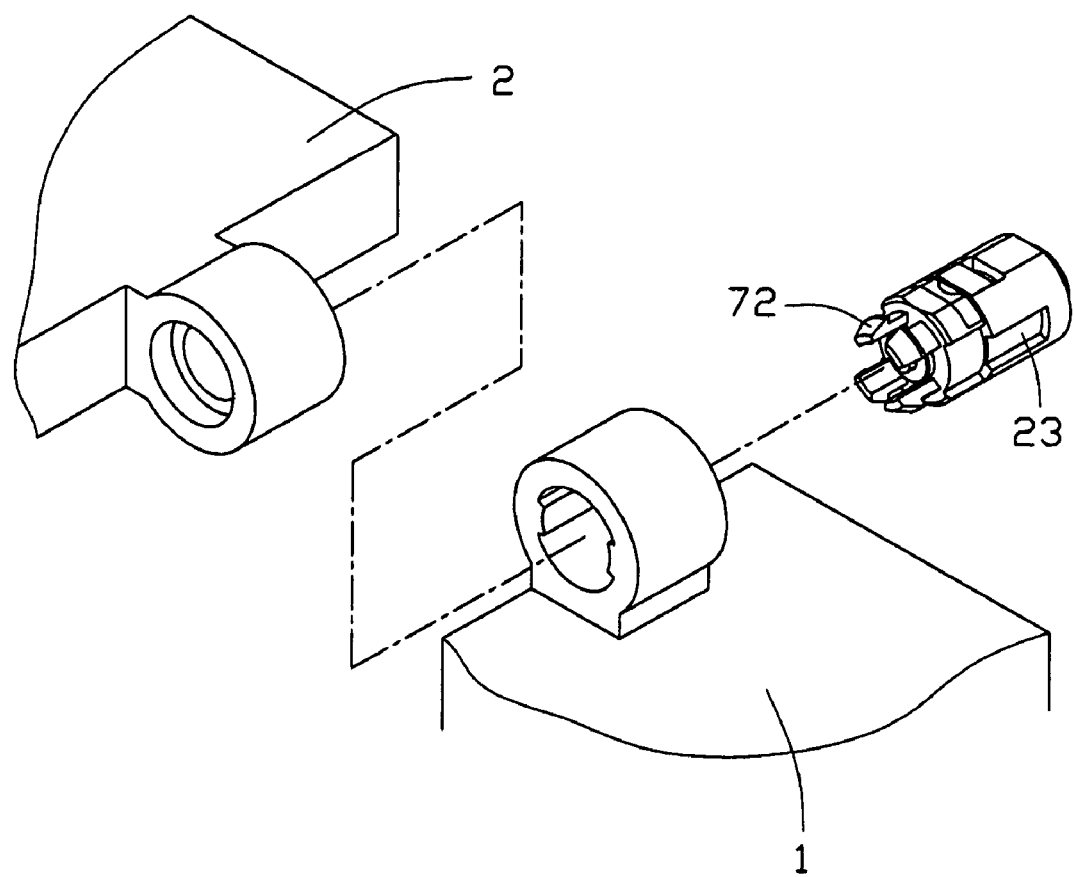
FIG. 5 is an isometric view showing the hinge device of FIG. 2, together with a first body and a second body of a foldable apparatus.

Referring to FIGS. 1–5, a hinge device in accordance with the present invention is used to rotatably connect a first body 1 and a second body 2 of a foldable apparatus. The hinge device comprises a first hinge sleeve 20 connected to the first body 1, a second hinge sleeve 70 connected to the second body 2, a spring member 30 received in the first sleeve 20, a first disk 50 fitted unrotatably into the first sleeve 20, a stopper 40 sandwiched between the first disk 50 and the first sleeve 20, a second disk 60 fitted unrotatably into the second sleeve 20 and abutting the first disk 50, a pin sandwiched between the first and second disk 50, 60, and a shaft 10 extending through the above members to form an engagement assembly.

The first sleeve 20 defines a pair of sliding cutouts 22 in an upper portion thereof, and a pair of dents 23 in an outer surface thereof for unrotatably engaging with the first body 1 of the foldable apparatus. The sliding cutouts 22 are configured so that the first disk 50 can be axially slidably fitted into the main body 21.

In the preferred embodiment, the spring member 30 is a coil spring.

The first disk 50 comprises a first annular body 52, and a pair of first wing portions 51 extending oppositely from the first annular body 52. In the preferred embodiment, one of the first wing portions 51 defines a receiving recess 511 for receiving the pin 90. The other one first wing portion 511 projects to form a platform 512 as a balancing member for offsetting an unbalance caused by the pin 90.

The stopper 40 is shaped so that the pin 90 can be further kept in the receiving recess 511 of the first disk 50. The stopper 40 comprises two blocks 42 bent upwardly therefrom, corresponding to the first wing portions 51.

The second disk 60 comprises a second annular body 61, and a pair of second wing portions 62 extending oppositely therefrom. In the preferred embodiment, the second wing portions define two engaging recesses 621, 622, arranged at a predetermined angular position (the same as defined by the staying angle of the first body 1 relative to the second body 2). A radian of each engaging recess 621, 622 is slightly smaller than that of the recess 511 so that the pin 90 can be readily switched between the engaging recesses 621, 622.

The pin 90 is cylinder-shaped, and is switchably received in spaces defined by the receiving recess 511 and the engaging recess 621 or 622.

The second hinge sleeve 70 comprises a plurality of resilient claws 72 extending from an end surface thereof, and a plurality of tabs 73 extending from the other end thereof for restricting the second wing portions 62 of the second disk 60 therebetween.

The shaft 10 comprises a cap 11 and a step-shaped rod 12.

In assembly, the rod 12 of the shaft 10 successively extends through the first hinge sleeve 20, the spring member 30, the stopper 40, the first disk 50, the second disk 60, the second hinge sleeve 70 and an annular washer 80, and finally is riveted to form an engagement assembly. The first wing portions 51 of the first disk 50 are received in the cutouts 22 of the first hinge sleeve 20. The pin 90 is received in the space defined by the receiving recess 511 of the first disk 50 and the engaging recess 622 of the second disk 60. The spring member 30 presses the first disk 50 so that the platform 512 of the first disk 50 abuts against a surface of the second disk 60.

The first hinge sleeve 20 of the combined hinge device is unrotatably attached to the first body 1 of the foldable apparatus by means of the dents 23. The second hinge sleeve 70 is unrotatable attached to the second body 2 of the foldable apparatus by means of the claws 72.

In operation, as the second body 2 together with the second hinge sleeve 70 is rotated away from the first body 1, the second disk 60 is driven to rotate relative to the first disk 50. The pin 90 is moved with rotation and released from the engaging recess 622 of the second disk 60. The spring member 30 is compressed. As the pin 90 continues to rotate over the surface of the second disk 60, the second body 2 will stay in any angular position relative to the first body 1 via rolling friction between the pin 90 and the surface of the second disk 60 and resilient force of the spring member 30. The pin 90 then seats in the engaging recess 621 of the second disk 60 via the elastic recovery of the spring member 30. The second body 2 is thus hold at the predetermined angular position relative to the first body 1.

In the present invention, the stopper 40 is used to prevent the pin 90 radialy sliding away from the receiving recess 511. The stopper 40 can be omitted if the pin 90 fits well in the receiving recess 511.

In the preferred embodiment, the predetermined holding angle between the second body 2 and the first body 1 can be varied by setting varied engaging recesses 621. In addition, as the pin 90 rotates, the abrasion of the pin 90 can be equalized. The equalizing ability can be increased if the number of the pins is increased. Furthermore, the platform 512 can be replaced by another pin.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A hinge device adapted to connect two parts of a foldable apparatus, the parts being rotated to define a first angle therebetween, the hinge device comprising:
    a first hinge sleeve adapted to be connected to one part of the foldable apparatus;
    a second hinge sleeve adapted to be connected to the other part of the foldable apparatus;
    a pin;
    a first disk fitted unrotatably into the first hinge sleeve, the first disk comprising a receiving recess receiving the pin, and a balancing member for offsetting an unbalance causing by the pin;
    a spring member received in the first hinge sleeve, and sandwiched between the first hinge sleeve and the first disk;
    a second disk fitted unrotatably into the second hinge sleeve and abutting the first disk, the second disk defining at least two engaging recesses, the engaging recesses engaging with the pin under the effect of resilient force of the spring member, wherein the two engaging recesses define a second angel therebetween which is the same as the first angel; and
    a shaft combining the first hinge sleeve, the spring, the first disk, the second disk and the second hinge sleeve together; wherein
    in operation, the pin is firstly received in a space defined by the receiving recess and one of the engaging recesses, then second hinge sleeve is rotated relative to the first hinge sleeve, thereby driving the second disk to move relative to the first disk, the pin is rotated and received in a space defined by the receiving recess and the other one of the engaging recesses.

2. The hinge device as described in claim 1, wherein the first hinge sleeve defines at least one cutout at an upper portion thereof, and at least one dent at an outer surface thereof adapted for unrotatably engaging with said one part of the foldable apparatus.

3. The hinge device as described in claim 2, wherein the first disk forms at least one first wing portion to be received in the at least one cutout of the first hinge sleeve, the receiving recess is defined in the at least one first wing portion.

4. The hinge device as described in claim 1, wherein the spring member is a coil spring.

5. The hinge device as described in claim 1, further comprising a stopper sandwiched between the first hinge sleeve and the first disk, wherein the stopper forms a bent block for keeping the pin in the receiving recess of the first disk.

6. The hinge device as described in claim 1, wherein a radian of each of the engaging recesses of the second disk is slightly less than that of the receiving recess of the first disk.

7. The hinge device as described in claim 1, wherein the second hinge sleeve comprises a plurality of claws extending from an end surface thereof, and a plurality of tabs extending from the other end surface thereof for restricting the second disk therein.

8. The hinge device as described in claim 1, wherein the shaft comprises a cap and a rod.

9. The hinge device as described in claim 1, wherein the balancing member of the first disk comprises a platform.

10. The hinge device as described in claim 1, wherein the balancing member of the first disk comprises a pin.

11. A hinge device for a foldable apparatus, said foldable apparatus having a first part and a second part, the hinge device comprising:
    a first hinge sleeve attached unrotatably to the first part of the foldable apparatus;
    a second hinge sleeve attached unrotatably to the second part of the foldable apparatus;
    a first disk received axially slidably but unrotatably in the first hinge;

a second disk attached unrotatably to the second hinge;

a shaft combining the first hinge sleeve, the first disk, the second disk and the second hinge sleeve together;

one of the first disk and the second disk defining a receiving recess and a balancing member, the other one defining at least two engaging recesses which defines an angle therebetween;

a spring means received in the first sleeve for urging the first disk resiliently abutting an end surface of the second disk;

a pin switchably received in two spaces defined by the receiving recess and the at least two engaging recesses, and moving with rotation on said end surface of the second disk.

12. The hinge device as described in claim 11, wherein the first hinge sleeve defines at least one cutout in an upper portion thereof, and at least one dent in an outer surface thereof for unrotatably engaging with the fist part of the foldable apparatus.

13. The hinge device as described in claim 12, wherein the first disk forms at least one first wing portion to be received in the at least one cutout of the first hinge sleeve, the receiving recess is defined in the at least one first wing portion.

14. The hinge device as described in claim 11, wherein the balancing member comprises a platform for offsetting an unbalance causing by the pin.

15. The hinge device as described in claim 11, wherein the radian of each of the engaging recesses is slightly less than that of the receiving recess.

16. The hinge device as described in claim 11, further comprising a stopper sandwiched between the first sleeve and the first disk, wherein the stopper forms a bent block to keep the pin in the receiving recess.

17. The hinge device as described in claim 11, wherein the second hinge sleeve comprises a plurality of claws extending from an end surface thereof, and a plurality of tabs extending from the other end surface thereof for unrotatably fitting the second disk therebetween.

18. The hinge device as described in claim 11, wherein the shaft comprising a cap and a rod.

19. A hinge device for a foldable apparatus, said foldable apparatus having a first part and a second part, the hinge device comprising:

a first hinge sleeve attached unrotatably to the first part of the foldable apparatus;

a second hinge sleeve attached unrotatably to the second part of the foldable apparatus;

a first disk received axially slidably but unrotatably in the first hinge;

a second disk attached unrotatably to the second hinge;

a shaft combining the first hinge sleeve, the first disk, the second disk and the second hinge sleeve together;

one of the first disk and the second disk defining a receiving recess, the other one defining at least two engaging recess which defines an angle therebetween;

a spring means received in the first sleeve for urging the first disk resiliently abutting an end surface of the second disk;

a pin switchably received in two spaces defined by the receiving recess and the at least two engaging recesses, and moving with rotation on said end surface of the second disk.

* * * * *